US012004647B2

(12) United States Patent
Martini

(10) Patent No.: US 12,004,647 B2
(45) Date of Patent: Jun. 11, 2024

(54) APPARATUS FOR CARRYING PRODUCTION SOUND MIXING COMPONENTS

(71) Applicant: Kenneth Martini, Sonoma, CA (US)

(72) Inventor: Kenneth Martini, Sonoma, CA (US)

( * ) Notice: Subject to any disclaimer, the term of this patent is extended or adjusted under 35 U.S.C. 154(b) by 786 days.

(21) Appl. No.: 16/913,325

(22) Filed: Jun. 26, 2020

(65) Prior Publication Data

US 2021/0401176 A1 Dec. 30, 2021

(51) Int. Cl.

| | |
|---|---|
| ***A47B 97/00*** | (2006.01) |
| ***A45C 11/00*** | (2006.01) |
| ***A45C 13/02*** | (2006.01) |
| ***A45C 13/04*** | (2006.01) |
| ***A47B 43/00*** | (2006.01) |
| ***A47B 81/00*** | (2006.01) |
| ***H04H 60/05*** | (2008.01) |

(52) U.S. Cl.

CPC .............. *A47B 97/00* (2013.01); *A45C 11/00* (2013.01); *A45C 13/02* (2013.01); *A45C 13/04* (2013.01); *A47B 43/00* (2013.01); *A47B 81/00* (2013.01); *H04H 60/05* (2013.01); *A45C 2011/001* (2013.01)

(58) Field of Classification Search

CPC ......... A47B 97/00; A47B 43/00; A47B 81/00; A45C 11/00; A45C 13/02; A45C 13/04; A45C 2011/001; A45C 2013/025; A45C 2013/026; A45C 13/26; H04H 60/05

See application file for complete search history.

(56) References Cited

U.S. PATENT DOCUMENTS 1,137,579 A * 4/1915 Cohn ..................... A45C 13/02 190/110
2,517,757 A * 8/1950 Adlerstein ................ A45F 3/04 383/41
3,516,523 A * 6/1970 Russell, Jr. ............. D06F 81/00 38/104
4,014,597 A 3/1977 Griffin, Jr.
(Continued)

FOREIGN PATENT DOCUMENTS

DE 2600731 A1 7/1977
DE 102010003120 A1 9/2011
(Continued)

OTHER PUBLICATIONS

Admin TGC, The Best Grill Cover to Invest in, https://barbecuegrillsexpert.com/the-best-grill-cover-to-invest-in/ Nov. 1, 2019, 20 pages, US.

*Primary Examiner* — Don M Anderson
*Assistant Examiner* — Justin Caudill
(74) *Attorney, Agent, or Firm* — Olav M. Underdal; IDP Patent Services

(57) ABSTRACT

An apparatus for carrying sound production components is disclosed, comprising a rigid frame including vertically interspaced first, second, and third surfaces. Each of the first surface, second surface, and third surface releasably engage with a plurality of sound production components. A first wing and a second wing are pivotally mounted to the third surface to releasably engage with at least one of the plurality of sound production components. A bag receives the rigid frame in a folded configuration and encloses the rigid frame and the plurality of sound production components.

18 Claims, 11 Drawing Sheets

(56) References Cited

U.S. PATENT DOCUMENTS 4,228,666 A * 10/1980 Perez-Alonso ........ A45C 13/28
70/67
5,161,868 A * 11/1992 Hooser .................. A47B 19/06
312/223.4
5,307,908 A * 5/1994 Shyr ........................ A45C 5/14
190/111
D368,387 S * 4/1996 Bureau .......................... D6/686
5,762,170 A * 6/1998 Shyr ........................ A45C 5/14
190/114
5,873,439 A * 2/1999 Liang ....................... A45C 5/14
280/43.1
5,893,572 A * 4/1999 Parks ........................ B62B 1/26
D34/24
6,102,172 A * 8/2000 Dercole ............... A45C 13/262
190/125
6,161,739 A * 12/2000 Bentzen .................... A45F 4/02
224/636
6,595,604 B1 * 7/2003 Peterson ................ A45C 13/02
190/110
7,021,436 B2 * 4/2006 Hoberman ............... A45C 5/14
190/18 R
8,919,508 B1 * 12/2014 Halko ...................... A45C 9/00
280/37
9,968,861 B2 * 5/2018 Brown, Sr. ............ A63H 3/003
10,021,948 B1 * 7/2018 Fell ........................ A45C 13/03
10,568,400 B2 * 2/2020 Shechter .................. A45C 5/03
2001/0013477 A1 8/2001 Campbell
2001/0032765 A1 * 10/2001 Tiramani ............ B60B 33/0021
190/115
2005/0099102 A1 * 5/2005 Villarreal ............... A47B 21/00
312/237
2005/0121275 A1 * 6/2005 Platte, III ................ A45C 5/14
190/110
2006/0096821 A1 * 5/2006 McKaba .............. A47B 43/003
206/278
2007/0193667 A1 8/2007 Beakey
2010/0089779 A1 * 4/2010 Bowers ................. G06F 1/1628
206/521
2018/0168308 A1 * 6/2018 Wilkin ..................... A45C 5/14
2018/0234127 A1 * 8/2018 Lambert ................... A61L 2/26

FOREIGN PATENT DOCUMENTS

ES 2402627 B1 * 5/2013 ........... A45C 7/0031
KR 200229134 Y1 7/2001
WO WO-2019173897 A1 * 9/2019 ............. A45C 13/04

* cited by examiner

APPARATUS FOR CARRYING PRODUCTION SOUND MIXING COMPONENTS

TECHNICAL FIELD

The embodiments generally relate to bags and electronic transport assemblies and, more specifically, relate to modular bags for carrying audio mixing components.

BACKGROUND

A production sound mixer is a member of a film production crew or television crew responsible for recording sound on set during the filmmaking or television production process using professional audio equipment. Equipment used may include various audio mixers and recorders, batteries, wireless radios, booms, audio storage components, headphones, cables, tools, sound logs, and power distribution systems. The specific equipment and amount thereof varies based on the production size and type.

The sound mixing professional often arrives with their equipment to capture a wide variety of sounds while considering the format of the finished product. Components are carried in a bag which holds each element and allows the sound mixing professional to move during the recording process.

In the current arts, bags are designed for specific equipment sizes and dimensions and only allow the user to carry the components in a single configuration. Using the carrying bag on a desktop, table, or other surface can be inconvenient for the sound mixing professional as the arrangement of the audio components is restricted to a single configuration. Further, it may be difficult to address technical problems, as current bags are unable to manage a large number of wires inherent in the production process.

SUMMARY OF THE INVENTION

This summary is provided to introduce a variety of concepts in a simplified form that is further disclosed in the detailed description of the embodiments. This summary is not intended to identify key or essential inventive concepts of the claimed subject matter, nor is it intended for determining the scope of the claimed subject matter.

Embodiments described herein provide an apparatus for carrying sound production components, comprising a rigid frame including vertically interspaced first, second, and third surfaces. Each of the first surface, second surface, and third surface releasably engage with a plurality of sound production components. A first wing and a second wing are pivotally mounted to the third surface to releasably engage with at least one of the plurality of sound production components. A bag receives the rigid frame in a folded configuration and encloses the rigid frame and the plurality of sound production components.

The embodiments provide a means for carrying sound production components as well as arranging the frame on a surface such as a desktop, table, etc.

The apparatus may be carried both within the bag or using the frame to permit use in various settings.

In one aspect, a handle is releasably engaged with the rigid frame via one or more handle brackets.

In one aspect, the handle is pivotally engaged with the handle brackets.

In one aspect, the bag permits the handle to extend to the exterior of the bag.

In one aspect, the first and the second wings are arrangeable in a folded and an unfolded configuration.

In one aspect, the plurality of sound production components comprise at least one of the following: at least one power distribution system, at least one recorder, at least one audio mixer, at least one audio recorder, at least one battery, at least one wireless radio, at least one audio storage component, and a plurality of cables.

In one aspect, a computing device mount permits the mounting of a computing device.

In one aspect, a support is pivotally engaged with the first surface. The support arranges the frame in a suitable position when positioned on a surface.

BRIEF DESCRIPTION OF THE DRAWINGS

A complete understanding of the present embodiments and the advantages and features thereof will be more readily understood by reference to the following detailed description when considered in conjunction with the accompanying drawings wherein.

DETAILED DESCRIPTION

Figure 1:
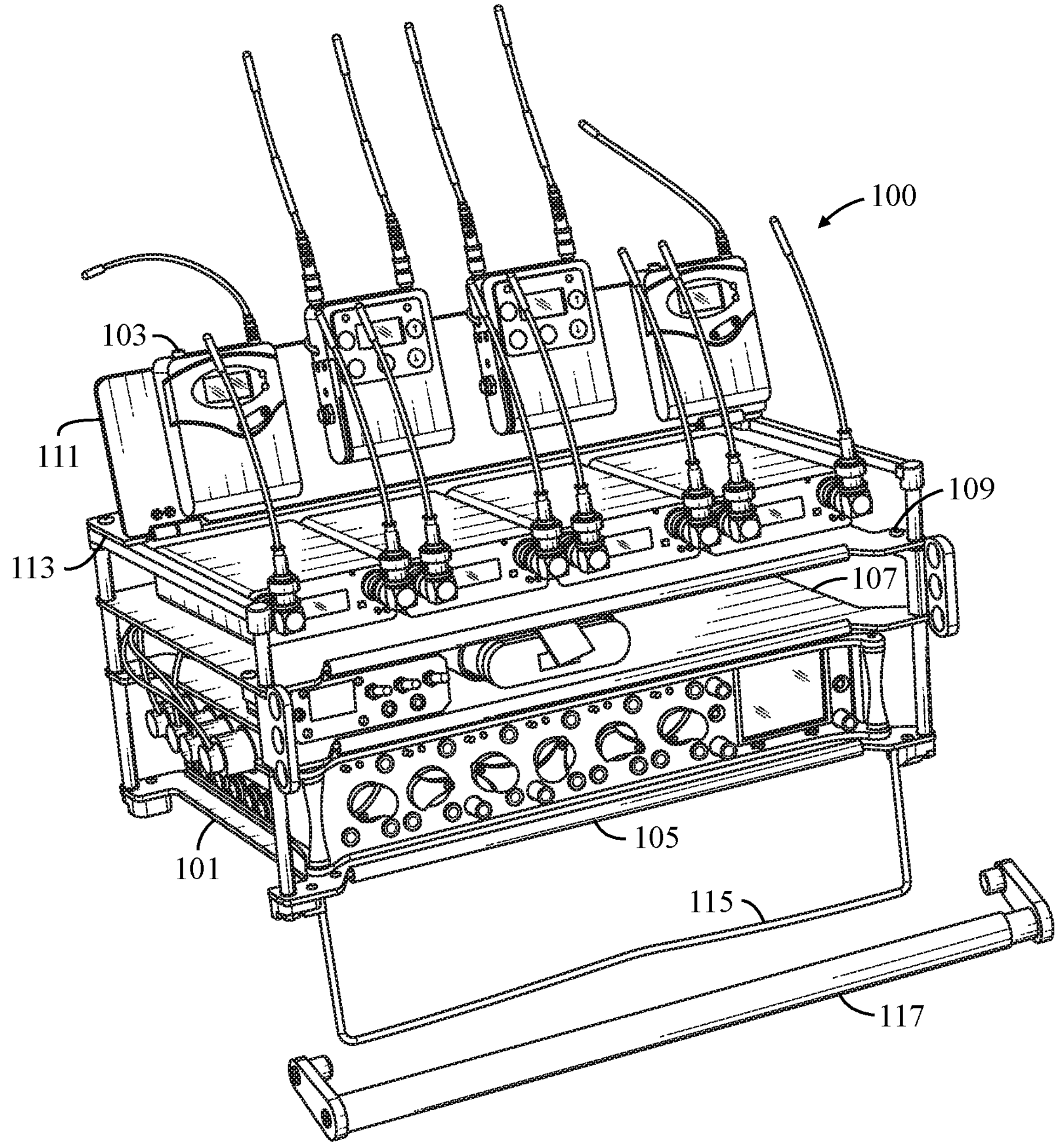
FIG. 1 illustrates a perspective view of the frame of the carrying apparatus and sound production components mounted thereto, wherein the frame is in a folded configuration, according to some embodiments.

The specific details of the single embodiment or variety of embodiments described herein are to the described apparatus. Any specific details of the embodiments are used for demonstration purposes only, and no unnecessary limitations or inferences are to be understood therefrom.

Before describing in detail exemplary embodiments, it is noted that the embodiments reside primarily in combinations of components and procedures related to the apparatus. Accordingly, the apparatus components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

The specific details of the single embodiment or variety of embodiments described herein are set forth in this application. Any specific details of the embodiments are used for demonstration purposes only, and no unnecessary limitation or inferences are to be understood therefrom. Furthermore, as used herein, relational terms, such as “first” and “second,” “top” and “bottom,” and the like, may be used solely to distinguish one entity or element from another entity or element without necessarily requiring or implying any physical or logical relationship, or order between such entities or elements.

In general, the embodiments provided herein relate to an apparatus for carrying production sound mixing components. The equipment used may include various audio mixers and recorders, batteries, wireless radios, booms, audio storage components, headphones, cables, tools, sound logs, and power distribution systems. Each equipment item may be releasably engaged with a frame, which may be arranged in a folded or unfolded configuration. The frame may be positioned within a bag during use or may be removed from the bag to allow the frame to be positioned on a surface such as a desktop, table, etc.

As used herein, the term “sound production components” relates to any electronic or non-electronic component utilized by a sound mixing professional during the filming and production processes. For example, sound production components may include audio mixers and recorders, batteries, wireless radios, booms, audio storage components, headphones, cables, tools, sound logs, and power distribution systems. One skilled in the arts will readily understand that the embodiments may be used to transport and operate sound production components not specifically mentioned in the instant disclosure.

The sound product components may be held in place on one or more surfaces using various attachment or securing means known in the arts. For example, hook-and-loop systems may be used to releasably the sound production components with the surfaces or portion thereof. In another example, rubber bumpers may be provided on the surface to secure the sound production component by compressive force.

FIG. 1 illustrates a perspective view apparatus 100 having a frame 101 sound production components 103 mounted thereto. The frame 101 is comprised of a first surface 105, second surface 107, and third surface 109 arranged as a first tier, second tier, and third tier respectively. Each surface permits the utilization, support, and releasable engagement of various sound mixing components utilized by the sound mixing professional during the filming and production processes. A folding surface 111 is pivotally mounted to the third surface 109 at the top portion 113 of the apparatus 100. The folding surface 111 provides a mounting surface for one or more of the sound production components 103. A support 115 is pivotally mounted to the bottom side of the first surface 105 to support the frame 101 when positioned on a surface. The support 115 adjusted the angle of the frame when rested on a surface to provide easy access, manipulation, operation, and interpretation of the sound mixing components 103 during use. A handle 117 is shown removed from the frame 101. The handle 117 may be selectively attached during use.

In some embodiments, each tier facilitates the organization of sound mixing components. Tier heights may be adjusted based on the size and number of sound mixing components used. The first, second and third surfaces provide attachments for the sound mixing components to be mounted thereto while providing protection from shock, impact, and the like.

Figure 2A:
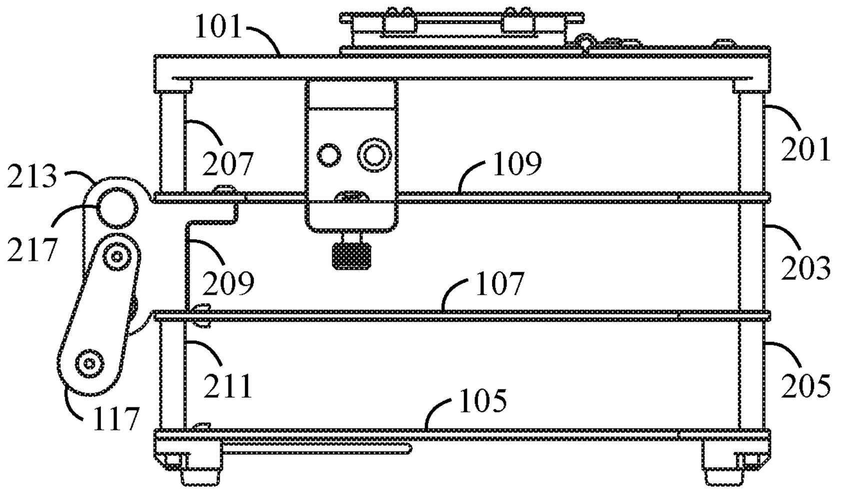
FIG. 2A illustrates a side elevation view of the apparatus frame, according to some embodiments.

FIG. 2A illustrates a side elevation view of the frame 101. Members 201,203,205,207,209,211 are positioned between the first, second, and third surfaces 105, 107, 109 to provide vertical space wherein the sound mixing components are disposed. A handle bracket 213 is mounted to a first side 215 of the frame 101 to pivotally engage the handle 117. The handle 117 is received by at least one aperture 217 provided on the handle bracket 213.

Figure 2B:
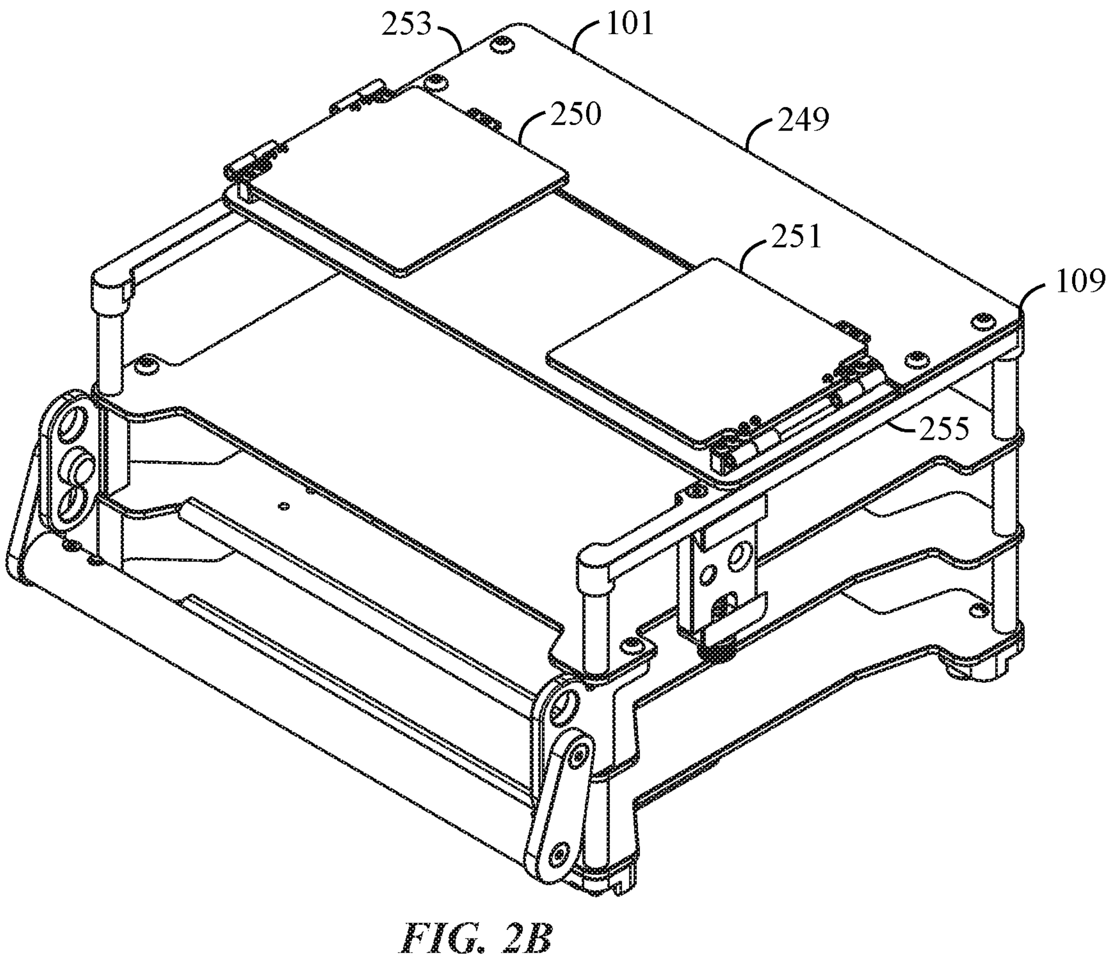
FIG. 2B illustrates a perspective view of the frame of the carrying apparatus, according to some embodiments.

FIG. 2B illustrates a perspective view of the frame 101 of the apparatus. A first wing 250 and a second wing 251 are pivotally mounted to the top side 249 of the third surface 109 to allow the user to selectively fold or unfold each wing 250, 251. The first wing 250 unfolds to extend laterally over a first edge 253 of the third surface 109 while the second wing 251 unfolds to extend laterally over a second edge 255 of the third surface 109.

In some embodiments, each wing 250, 251 may be raised from the third surface 109 to permit the attachment of a at least one sound mixing component while in a folded configuration as illustrated in FIG. 2B.

Figure 2C:
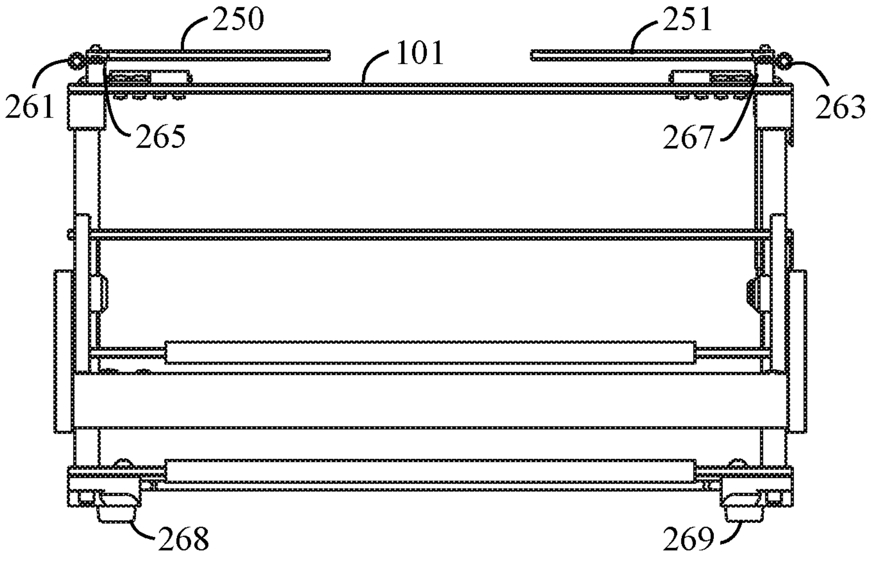
FIG. 2C illustrates a front elevation view of the frame and shelving, according to some embodiments.
Figure 2D:
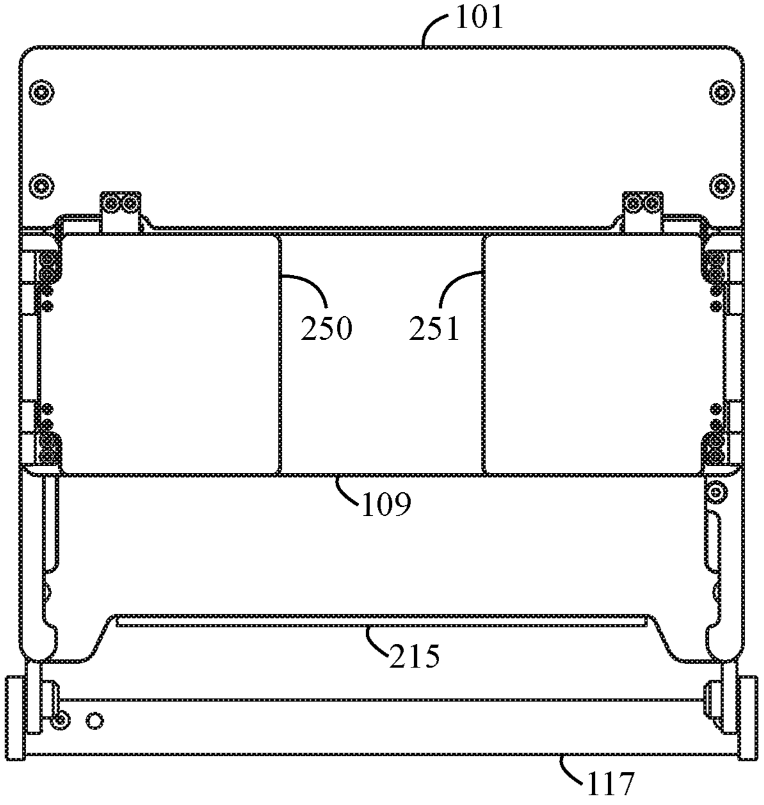
FIG. 2D illustrates a top plan view of the frame, according to some embodiments.

FIG. 2C illustrates a front elevation view of the frame 101 and shelving (first, second, and third surfaces). Each wing 250,251 includes a pivot 261,263 to allow the wings to pivot. Members 265,267 vertically raise the wings 250,251 to permit the attachment of a sound production component when in a folded configuration. Footings 268,269 are provided on each corner of the bottom side 271 of the frame to retain the frame 101 on a desktop or similar surface. FIG. 2D illustrates a top plan view of the frame 101 showing the top of the third surface 109 and wings 250,251. The handle 117 is mounted to the first side 215 to allow the user to carry the apparatus 100 during use.

Figure 3:
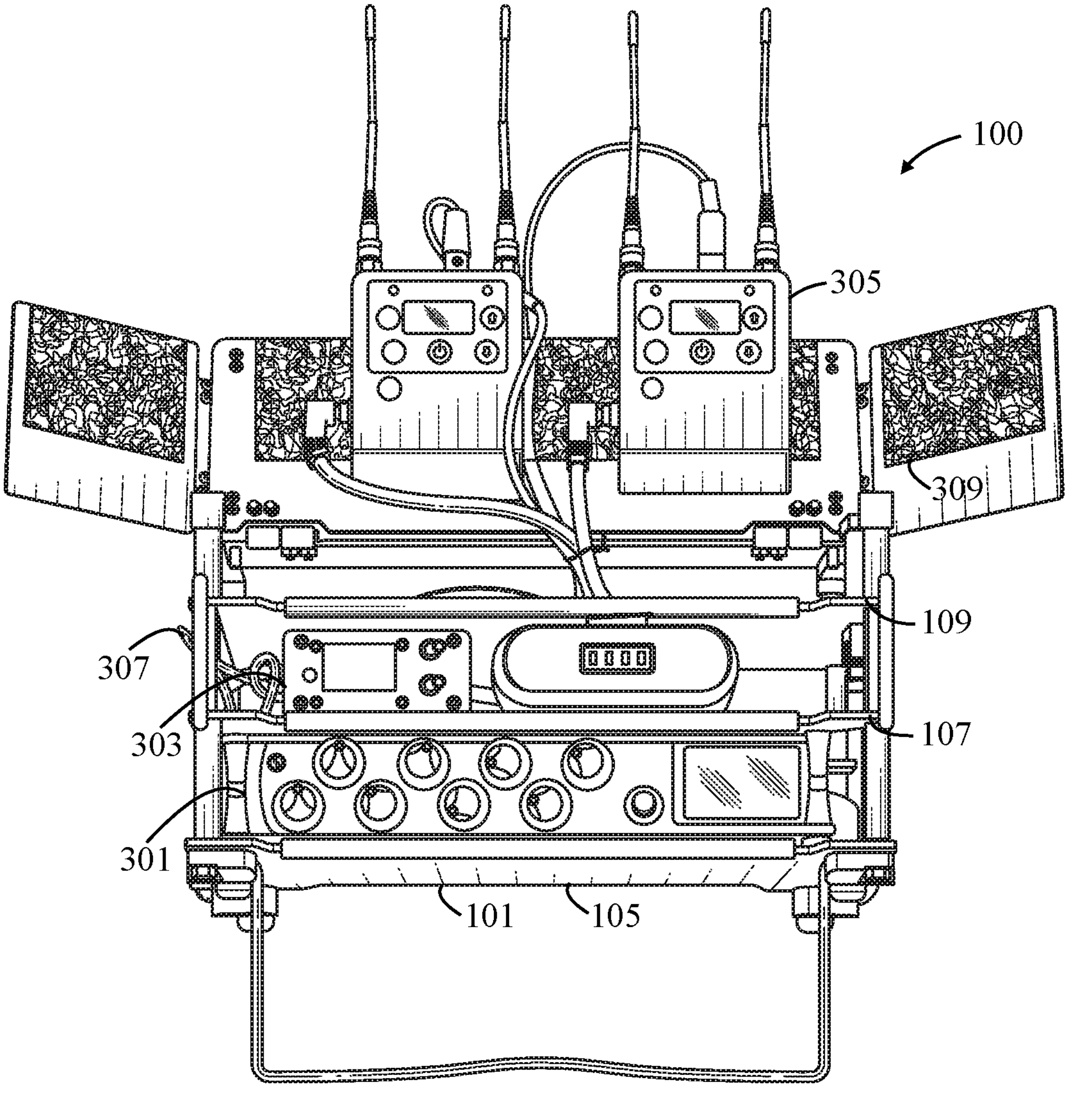
FIG. 3 illustrates a perspective view of the frame of the carrying apparatus and sound production components thereof wherein the frame is arranged in an unfolded configuration, according to some embodiments.
Figure 4A:
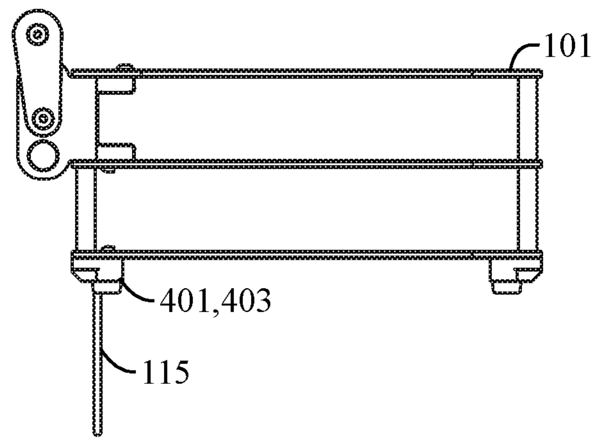
FIG. 4A illustrates a side elevation view of the support and frame, according to some embodiments
Figure 4B:
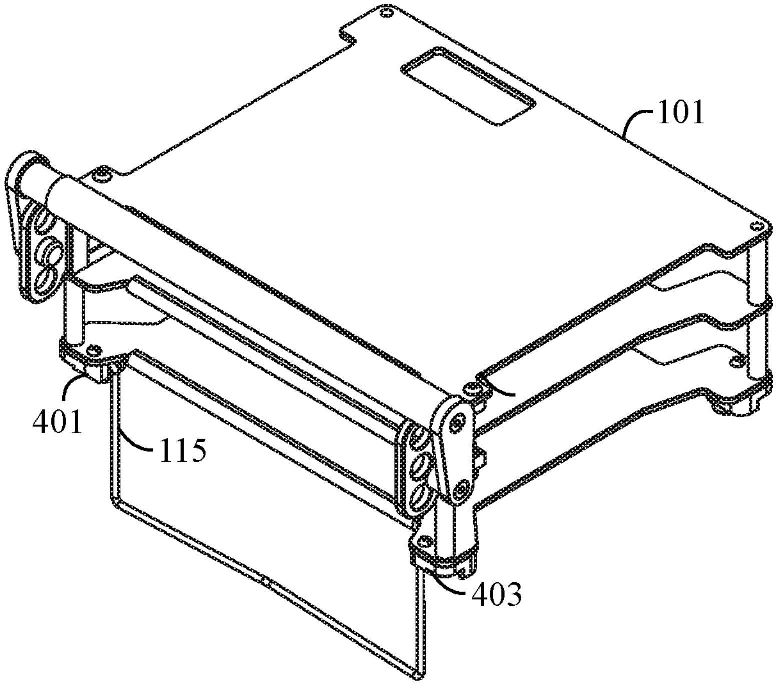
FIG. 4B illustrates a perspective view of the support and frame, according to some embodiments.
Figure 4C:
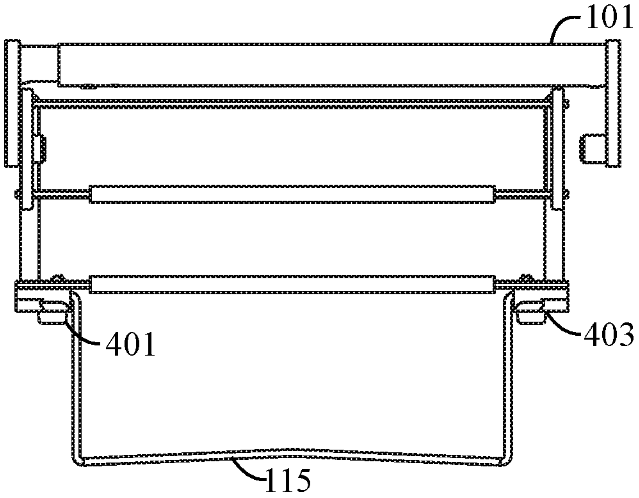
FIG. 4C illustrates a front elevation view of the support and frame, according to some embodiments.
Figure 4D:
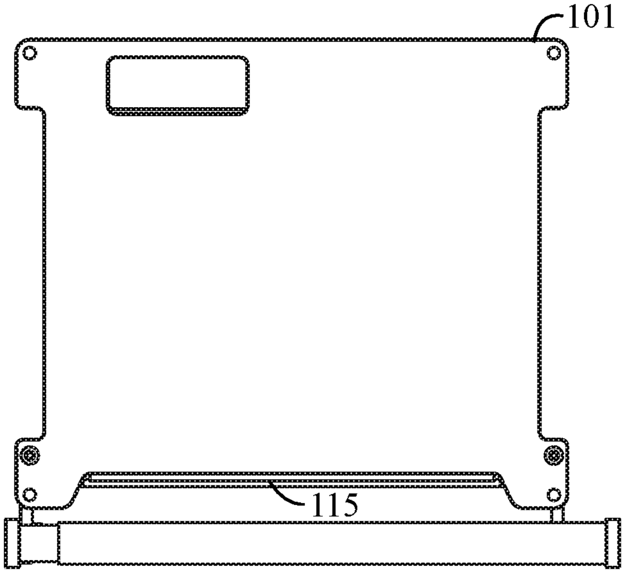
FIG. 4D illustrates a top plan view of the frame, according to some embodiments.

FIG. 3 illustrates a perspective view of the frame of the apparatus 100 and sound production components thereof wherein the frame is arranged in an unfolded configuration such that the wings 250,251 are extended laterally from the central portion of the frame 101. In an exemplary embodiment, the first surface 105 permits the engagement of a mixer and recorder 301. The second surface 107 permits mounting of a power distribution system 303 to distribute power to the various sound production components. The third surface 109 permits mounting of wireless radios 305 or similar communications systems. The apparatus 100 easily organizes and allows for the management of wires 307 in electrical communication with the various sound production components. In one example, the sound mixing components may be mounted using a hook-and-loop system (general mounting components 309) to easily attach and remove the various sound mixing components provided in the frame 101.

FIG. 4A-4D illustrate various views of the frame 101. The support 115 is pivotally engaged with receivers 401, 403 to allow the user to selectively fold and unfold the support during use or during storage. Specifically, FIGS. 4A-4D illustrates the support 115 in an unfolded configuration to facilitate the manipulation and operation of sound production components during use.

Figure 5:
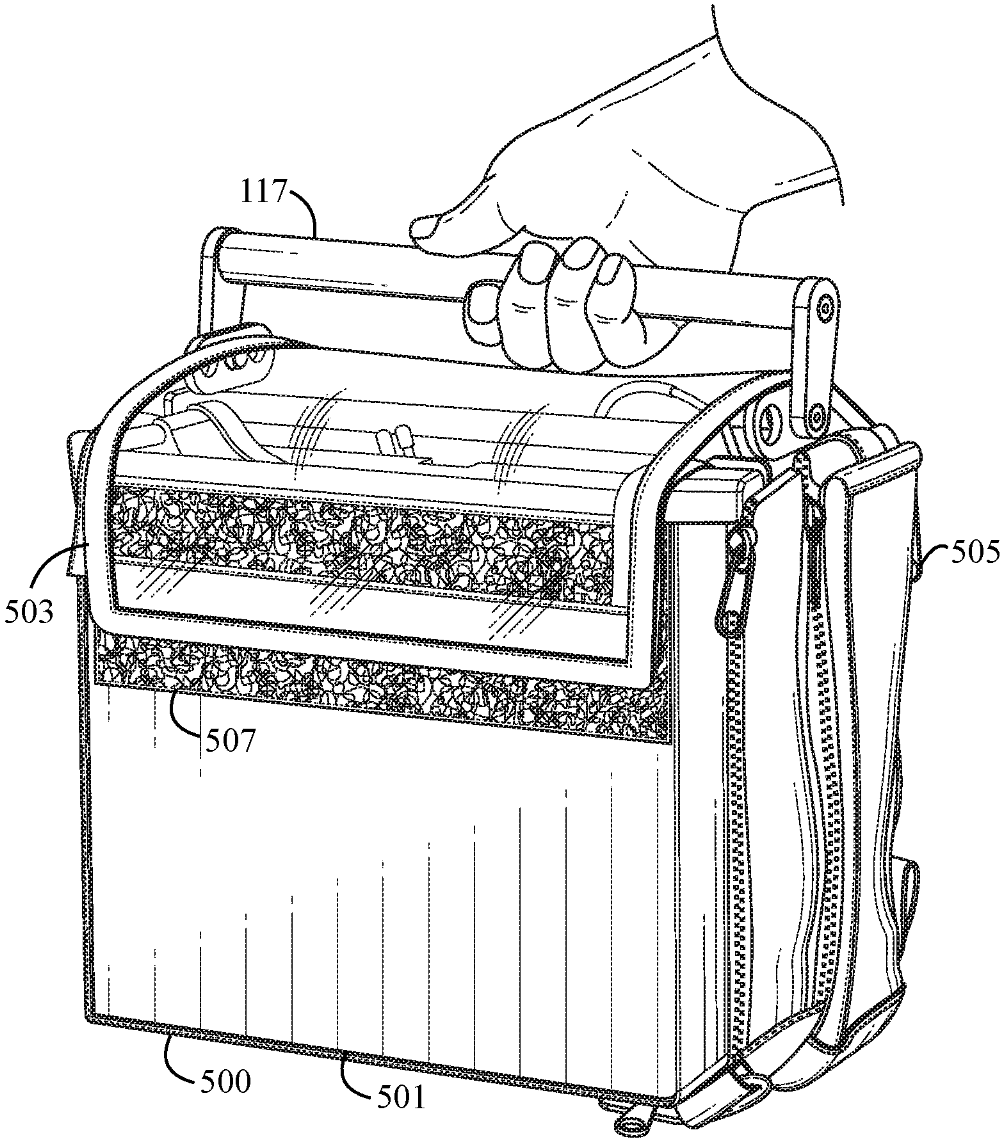
FIG. 5 illustrates a perspective view of the bag and handle for enclosing and carrying the sound production components, according to some embodiments.
Figure 6:
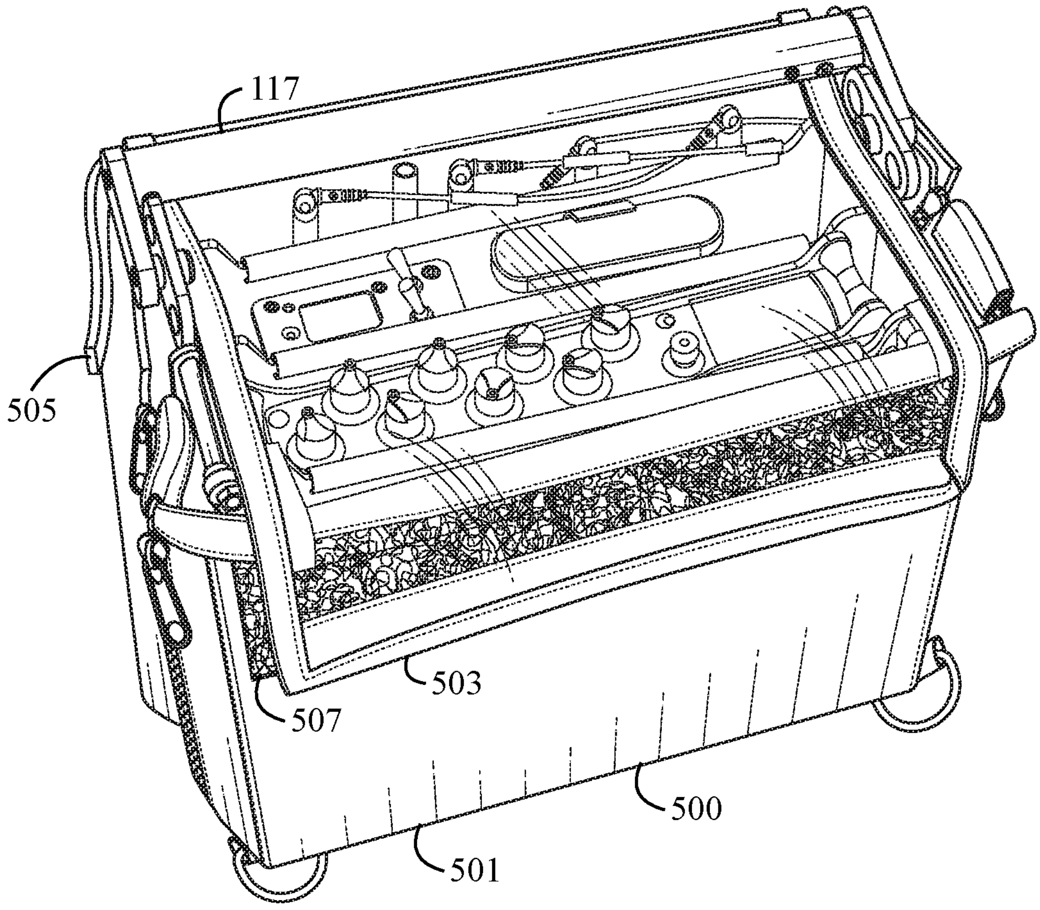
FIG. 6 illustrates a perspective view of the bag for enclosing and carrying the sound production components, according to some embodiments.

FIG. 5 and FIG. 6 illustrate perspective views of the bag 500 and handle 117. The bag 500 forms an enclosure around the frame and sound production components during transportation and during use. In such, the user may operate and perform various sound production tasks with the frame disposed within the enclosure of the bag 500 or may remove the frame from the bag 500. The bag 500 permits the handle 117 to extend to the exterior 501 of the enclosure to permit the utilization of the handle while the bag is closed around the frame. The cover 503 extends from the back side 505 to the front side 507 of the bag 117. The cover 503 may be constructed at least partially of a transparent or semi-transparent material to allow the user to view the displays and/or controls of the sound production components within the bag 500. The cover 503 may be releasably engaged via a hook-and-loop system, snap-fit mechanisms, or similar mechanism for releasably engaging textiles. The bag 500 provides a barrier between the exterior environment to protect the sound production components from impact, hazardous materials and debris, moisture, tampering, and the like.

In some embodiments, the bag 500 may comprise a plurality of compartments on the exterior of the bag wherein the user may dispose various items.

Figure 7:
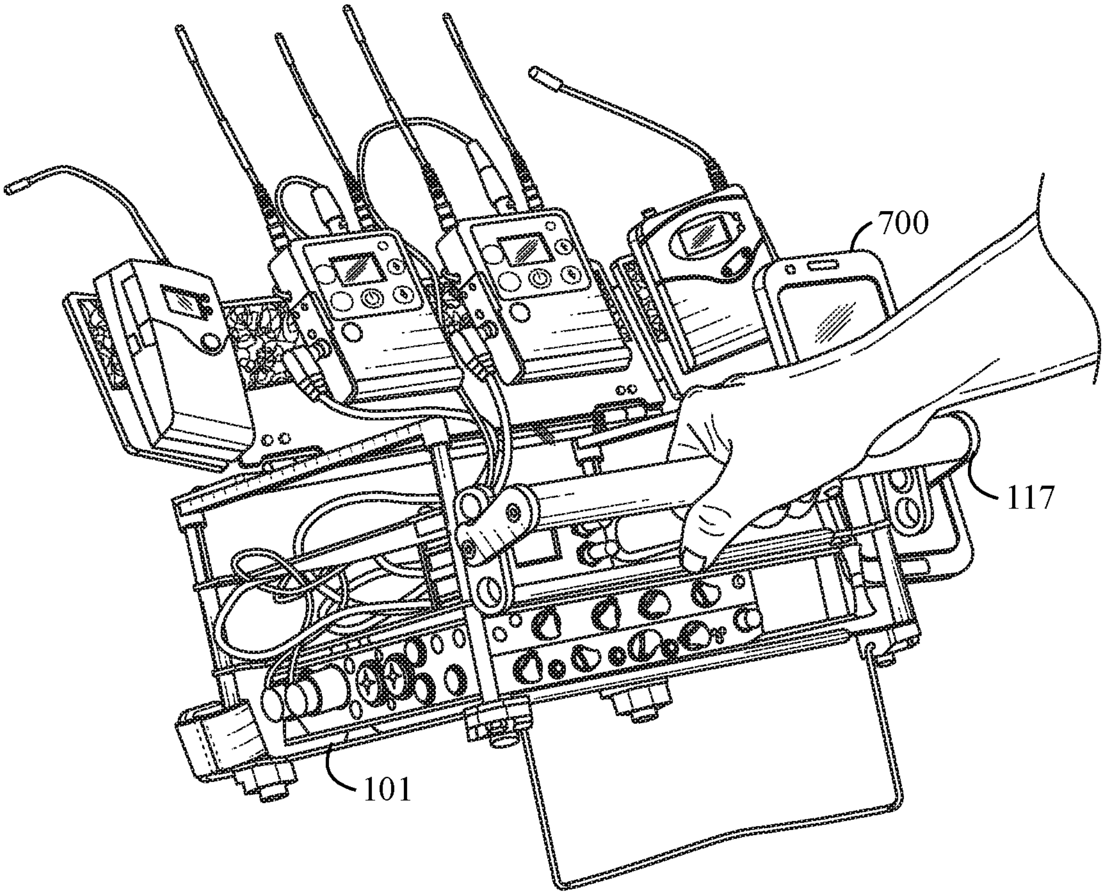
FIG. 7 illustrates a perspective view of the frame and sound production components, wherein the frame is in an unfolded configuration having the handle attached thereto, according to some embodiments.

FIG. 7 illustrates a perspective view of the frame 101 and sound production components, wherein the frame 101 is in an unfolded configuration having the handle 117 attached thereto. A computing device 700 such as a mobile phone or similar personal electronic device may be attached to the frame 101, via a mount for convenience, or to communicate with the various sound production components.

Figure 8:
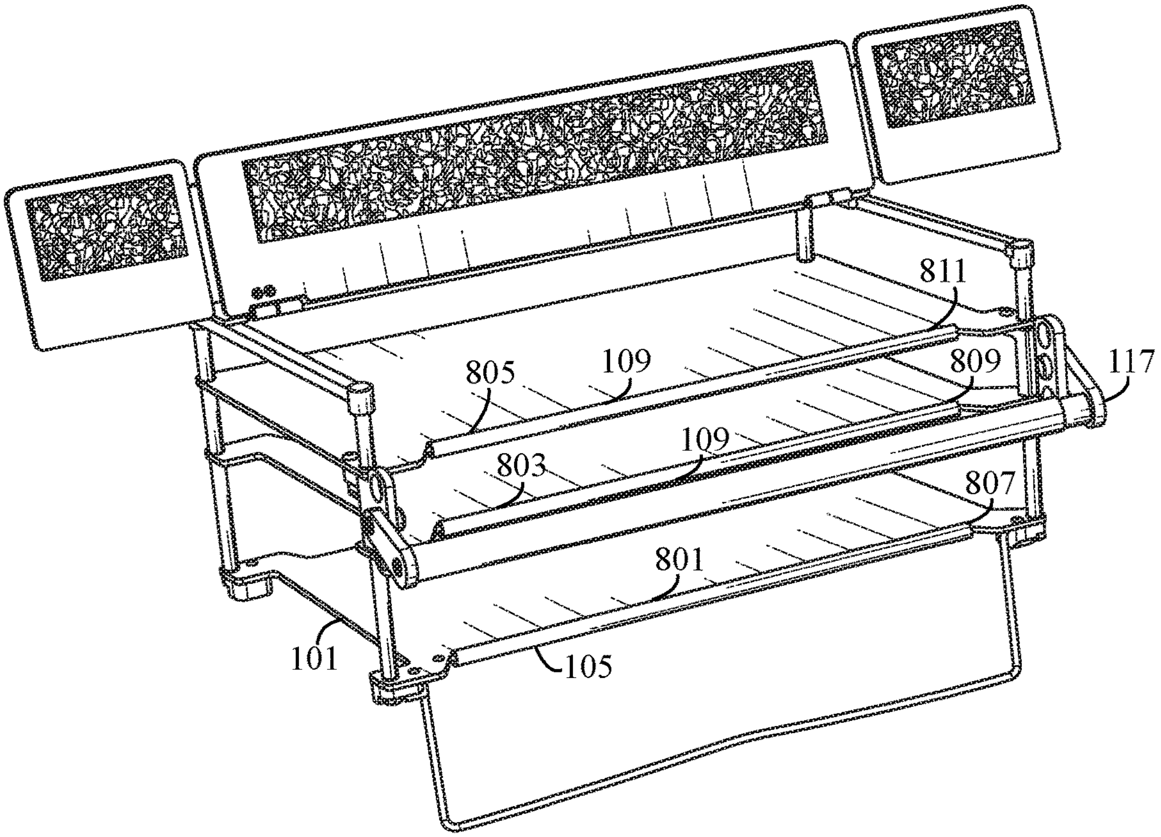
FIG. 8 illustrates a perspective view of the frame in an unfolded configuration having the handle attached thereto, according to some embodiments.

FIG. 8 illustrates a perspective view of the frame 101 in an unfolded configuration having the handle 117 attached thereto without the sound production components. Edge surfaces 801,803,805 are provided on front edges 807,809, 811 are provided to form a smooth surface and provide protection against damage to the frame 101. The edge surface 810,803,805 provide rigidity to the surfaces of the frame. The embodiments allow for modulation of the sizes, dimensions, and configuration of the apparatus to accept various sizes and numbers of sound mixing components.

In some embodiments, the materials of the frame are sufficiently rigid to prevent bending or undue stress during use of the apparatus. Metals, metal alloys and similar materials may be used to provide sufficient rigidity. Further, lightweight rigid materials including carbon fiber and the like may be implemented to reduce weight of the frame making the apparatus suitable for long-term use. Edges of the materials may be finished to round edges and reduce the risk of injury, abrasion, and the propensity for unfinished materials to catch and snag textiles.

Figure 9:
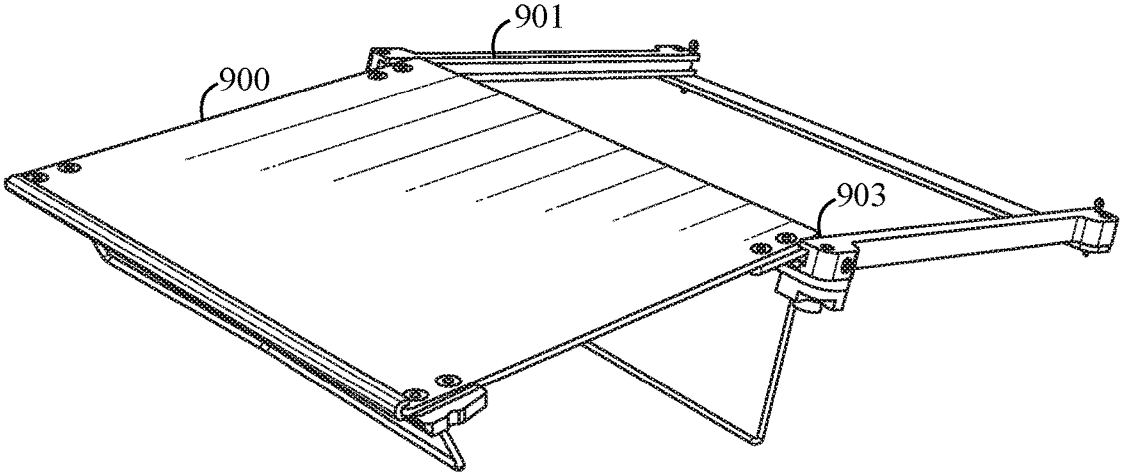
FIG. 9 illustrates a perspective view of the tray, according to some embodiments.

FIG. 9 illustrates a perspective view of the tray 900 providing a sliding surface for the various audio components. The tray 900 comprises a mounting portion 901 which may articulate via a pivot 903 provided on each side of the tray 900. The tray 900 provides the user the option to utilize at least one additional surface, thus forming a fourth surface for the releasable attachment of a plurality of audio equipment. One skilled in the arts will readily understand that the tray 900 may be configured to form any surface of the frame. Similarly, the frame is not limited to a number of surfaces and may be provided with additional surfaces as needed.

Figure 10:
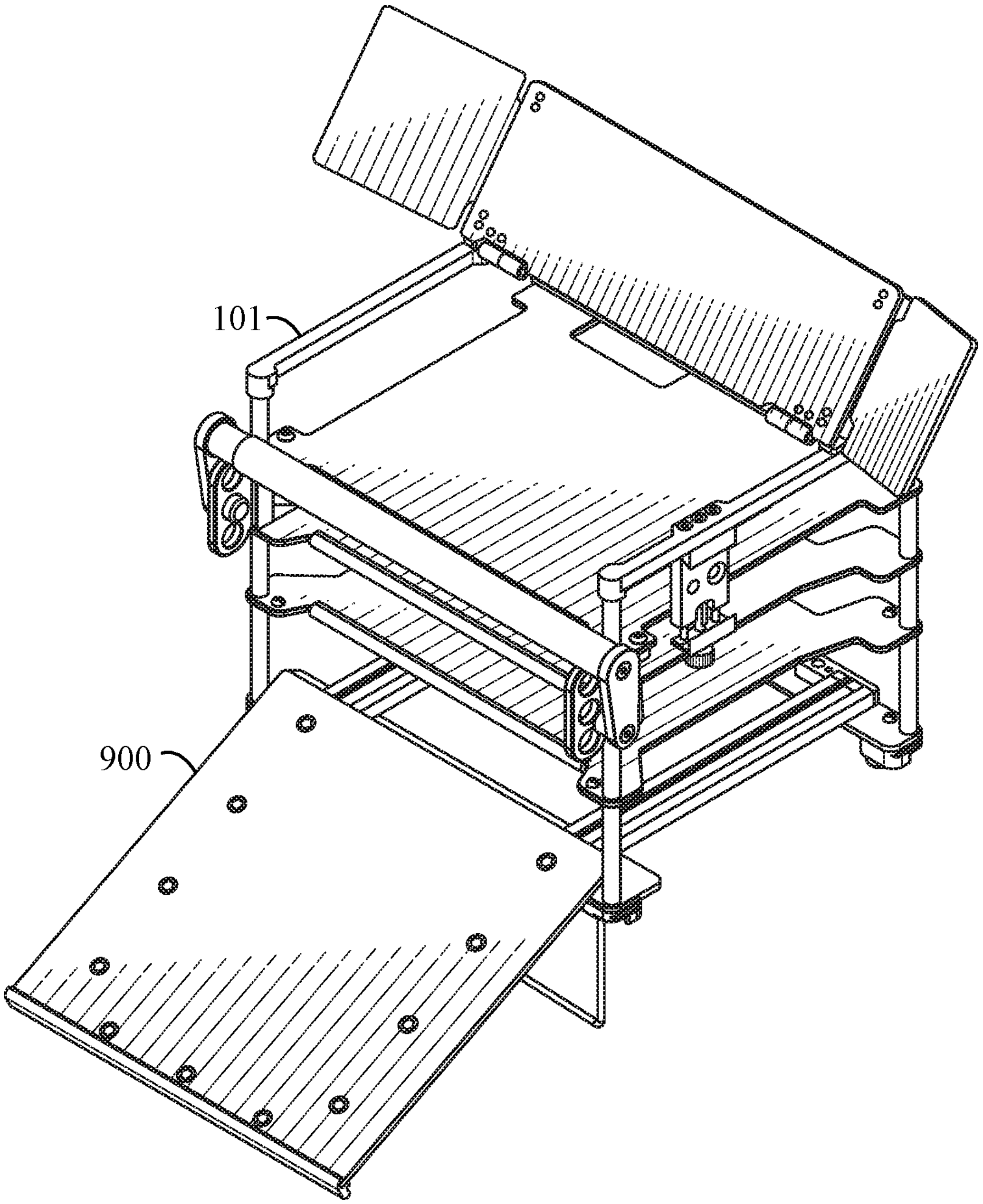
FIG. 10 illustrates a perspective view of the tray engaged with the frame, according to some embodiments.

FIG. 10 illustrates the tray 900 in an expanded configuration slidingly attached to the frame 101. The tray 900 may be slid into the frame 101 in a contracted configuration wherein the tray 900 forms a surface of the frame 101. In such, the tray 900 may retain one or more sound production components thereon while allowing the tray 900 to slide out of the frame to present the sound production component during use.

In some embodiments, the system may utilize a stationary fourth surface affixed to the frame.

In some embodiments, the internal frame is primarily constructed of carbon fiber and aluminum materials. This provides rigidity while maintaining light weight for portability. To facilitate component swapping or upgrading equipment the frame can be extended in height by replacing the four corner standoffs and their corresponding interior threaded rods.

When in use, the nylon shell surrounds the internal rack frame and acts as a typical location sound bag allowing equipment to be easily transported using the included shoulder strap or optional body harness. When removed, the system is converted to a desk console with a folding kickstand to elevate the front for enhanced viewing and operations. This also allows users full access to all equipment and connections.

In some embodiments, D-rings and other fastening points the outer bag or the internal frame may be suspended by a shoulder strap or a body harness.

In some embodiments, the system is configured to accept an optional integral power distribution device with rechargeable battery and a wire harness that distributes power to the various devices. The battery is mounted on an attached sled/bracket with a built-in power connector that allows one handed removal and replacement from the front of the unit. This is unique in that all other sound bags the battery does not have a battery sled/bracket, nor is it fastened securely and requires two hands to remove the battery from its connector.

In some embodiments, a torque hinged panel allows wireless devices with front controls to be viewed and operated at various angles. An optional pair of side wings that are attached to the hinged panel swing out and hold additional wireless equipment at an adjustable angle as well.

In some embodiments, the bag outer shell has a hook-and-loop system to secure a microphone boom pole. An exterior pocket pouch adds additional storage capacity to the travel bag, and can be removed and reattached by use of the hook-and-loop strips.

Many different embodiments have been disclosed herein, in connection with the above description and the drawings. It will be understood that it would be unduly repetitious and obfuscating to describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible in light of the above teachings without departing from the following claims.

What is claimed is:

1. An apparatus for carrying sound production components, comprising:

a rigid frame including vertically interspaced first, second, and third surfaces, each of the first surface, second surface, and third surface releasably engage with a plurality of sound production components;

a first wing and a second wing pivotally connected to a top portion of the rigid frame, the first and the second wing to releasably engage with at least one of the plurality of sound production components;

a bag to receive the rigid frame in a folded configuration and enclose the rigid frame and the plurality of sound production components, such that the rigid frame is removable from the bag; and a handle detachably engaged with the rigid frame via one or more handle brackets.

2. The apparatus of claim 1, wherein the handle is pivotally engaged with the handle brackets.

3. The apparatus of claim 1, wherein the bag permits the handle to extend to the exterior of the bag, when the rigid frame is positioned inside the bag and the handle is attached to the rigid frame.

4. The apparatus of claim 3, wherein the first and the second wings are arrangeable in a folded and an unfolded configuration.

5. The apparatus of claim 4, wherein the plurality of sound production components comprise at least one of the following: at least one power distribution system, at least one recorder, at least one audio mixer, at least one audio recorder, at least one battery, at least one wireless radio, at least one audio storage component, and a plurality of cables.

6. The apparatus of claim 5, further comprising a computing device mount to permit the mounting of a computing device.

7. The apparatus of claim 6, further comprising a support pivotally engaged with the first surface.

8. The apparatus of claim 7, wherein the support arranges the frame in a suitable position when positioned on a surface.

9. An apparatus for carrying sound production components, comprising:

a rigid frame including vertically interspaced first, second, and third surfaces, each of the first surface, second surface, and third surface releasably engage with a plurality of sound production components;

a folding surface pivotally mounted to a top portion of the rigid frame;

a first wing and a second wing pivotally mounted to the folding surface, the first and the second wing to releasably engage with at least one of the plurality of sound production components; and a bag to receive the rigid frame in a folded configuration and enclose the rigid frame and the plurality of sound production components, such that the rigid frame is removable from the bag.

10. The apparatus of claim 9, wherein the bag is comprised of a cover to enclose the plurality of sound production components within the bag.

11. The apparatus of claim 10, wherein the cover is at least partially constructed of a transparent material to permit a user to view the plurality of sound production components within the bag.

12. The apparatus of claim 9, further comprising a handle detachably engaged with the rigid frame via one or more handle brackets.

13. The apparatus of claim 12, wherein the handle is pivotally engaged with the handle brackets.

14. The apparatus of claim 12, wherein the bag permits the handle to extend to the exterior of the bag, when the rigid frame is positioned inside the bag and the handle is attached to the rigid frame.

15. The apparatus of claim 14, wherein the first and the second wings are arrangeable in a folded and an unfolded configuration.

16. The apparatus of claim 15, wherein the plurality of sound production components comprise at least one of the following: at least one power distribution system, at least one recorder, at least one audio mixer, at least one audio recorder, at least one battery, at least one wireless radio, at least one audio storage component, and a plurality of cables.

17. The apparatus of claim 16, further comprising a computing device mount to permit the mounting of a computing device.

18. An apparatus for carrying sound production components, comprising:

a rigid frame including vertically interspaced first, second, and third surfaces, each of the first surface, second surface, and third surface releasably engage with a plurality of sound production components;

a handle detachably engaged with the frame, the handle pivotally engaged to the frame via at least one handle bracket positioned on the first side of the frame, the handle permitting the frame to be carried;

a support pivotally mounted to the first surface to arrange the frame in a suitable position, wherein the support is configurable in an in-use and storage configuration;

a folding surface pivotally mounted to a top portion of the rigid frame;

a first wing and a second wing pivotally mounted to the folding surface, the first and the second wing to releasably engage with at least one of the plurality of sound production components; and a bag to receive the rigid frame in a folded configuration and enclose the rigid frame and the plurality of sound production components, such that the rigid frame is removable from the bag, the bag to provide a barrier between the plurality of sound production components and the environment, the bag comprising a cover at least partially constructed of a transparent material to permit the operation of the plurality of sound production components.

* * * * *